United States Patent Office 2,744,047
Patented May 1, 1956

2,744,047

PROCESS OF PREPARING DECORATIVE LAMINATES

Angelo P. Ingrassia and Edward T. Ruffin, Laurel, Miss., assignors to Masonite Corporation, Laurel, Miss., a corporation of Delaware No Drawing. Application June 2, 1952,
Serial No. 291,288

5 Claims. (Cl. 154—132)

The present invention relates to improved dense panels prepared from fibrous lignocellulose material. It relates more particularly to a novel process for the preparation of such panels. Even more particularly the invention relates to an improved method of preparing decorative lignocellulose laminates.

In the manufacture of decorative building panels and the like decorative articles, the art has heretofore usually applied resinous facing sheets to the surfaces of relatively dense panels such as already consolidated hardboards, plywood sheets, and the like. Facing and/or backing sheets have been applied to the surfaces of such previously consolidated and/or laminated panels and bonded thereto by the application of heat and pressure. This method of preparing decorative panels has been somewhat undesirable inasmuch as the density of the core materials was already fixed, i. e. from about 1.1 to about 1.3, and therefore incapable of any considerable variation to obtain different types of products. Furthermore, the additional heat treatment to which the core sheets were subjected in applying surface sheets caused embrittlement of the panels and resulted in products of low strength. More recently, the art has resorted to the use of low density core sheets, i. e. densities of less than 1, capable of consolidation to dense panels together with the application of decorative surface sheets in one operation. This method has been more desirable than the above-described older procedure since it has permitted greater latitude in density variation in the finished articles and has also avoided embrittlement of the panels. However, this process has been accompanied by several problems such as, for example, migration of moisture during the pressing operation causing stress in the finished product resulting in warping of the laminate. Another problem attendant upon this method of manufacture has been the dusting or scuffing of the preformed core sheet or sheets with the result that unsightly fibers have often been scattered over the facing and backing sheets. A further problem has resided in the provision of a satisfactory bond between the decorative surface sheets and the core of the laminate. All of these problems have contributed to making the manufacture of decorative panels costly and time consuming.

It is an object of the present invention to overcome the above outlined difficulties in the manufacture of decorative laminates and to provide a simple and economical method for their production.

It is a further object of the invention to prevent dusting and scuffing of the core of the laminates by the application of resins thereto during the manufacture of these articles. Another object of the invention resides in the provision of a greatly improved bond between the surface sheets and the core of these laminated articles.

One of the outstanding advantages of the present invention resides in the fact that the resin-treated lignocellulose sheets do not scuff or dust during the application of facing and backing sheets thereto, thus overcoming one of the most serious problems heretofore encountered by the art. A further advantage of the invention stems from the provision of this resin coating since the resin greatly increases the bond between the lignocellulose core and the facing and backing sheets.

Briefly, the invention comprises the preparation of a relatively light porous sheet of hydrolyzed lignocellulose fiber, the application of an aqueous resin mixture to the surfaces of the light porous sheet, and the subsequent compression and densification of the sheet together with facing and backing sheets under heat and pressure sufficiently elevated to cure the resin to insoluble state. Ordinarily, in the compression and densification of such sheets under heat and pressure, the final density, strength, and other physical characteristics of the finished panel, as well as its appearance, are dependent to a great degree upon the control of the moisture content of the sheet prior to and during the pressing operation. This problem is solved by the method of the present invention by means of first drying the light porous lignocellulose sheet until its moisture content is substantially zero. The resin is then applied to the surfaces of the sheet in the form of an aqueous mixture which may comprise a true resin solution, an aqueous dispersion wherein the resin is in colloidal or other finely dispersed condition, or the resin may be in emulsion. In any event, regardless of the particular type of aqueous resin mixture employed, the water content thereof may be closely controlled and, as a result thereof, the amount of moisture added to the sheet may be controlled within relatively close limits. Consequently, the compression of the resin-treated lignocellulose sheet may be carried out under conditions which may be varied according to the type product which it is desired to produce.

In carrying out the present invention, therefore, there is first prepared a light porous sheet of hydrolyzed lignocellulose fibers. Preferably the fiber is obtained from wood chips or their equivalent lignocellulose material by subjecting the same to hydrolysis and fibration treatment by subjecting the chips to the hydrolyzing action of high pressure steam in a gun and to explosive discharge therefrom as described in United States Patent No. 1,824,221. Other conventional methods of hydrolyzing lignocellulose material may be used and reduction to fiber can also be accomplished mechanically as by grinding or the like treatment.

As an illustration of the invention, hydrolyzed lignocellulose fiber obtained as described above according to United States Patent No. 1,824,221 was felted into sheets and passed through a drier. The sheets were quite porous, relatively light, and had a density of approximately 0.5. For the present purpose, sheets were prepared about 0.5–0.6 inch thick containing a small amount of petrolatum as a sizing material. The sheets were dried to a moisture content of substantially zero after which they were sprayed with an aqueous solution of phenol-formaldehyde resin containing about 68% resin solids and 32% water. The amount of resin solution deposited on the bone dry sheets was sufficient to provide about 12.5% of resin and about 5.8% of moisture on and in the surface of the sheets. Three of the resin treated sheets were then assembled into a stack and pressed between the platens of a hydraulic press at 2000 p. s. i. pressure. The press platens were heated by means of steam and when the temperature of the inner ply of the stack reached 159° C., the steam was shut off and cooling water run through the press platens. In this manner the laminate was cooled, under pressure, to a temperature of about 50° C. at which point it was removed from the press. The panel had a density of 1.39. The resin coated surfaces of the laminate were substantially impervious to water, alkalies, acids, and various organic solvents and, in addition, the bonding effect of the resin between the plies of the laminate was such that in attempting to pull the panel apart, rupture occurred in the plies rather than in the resinous glue line. When a similar laminate was prepared with the addition of a resin impregnated decorative facing sheet and a similar non-decorative backing sheet, a highly desirable non-warping panel was obtained.

In carrying out the broad intent of the invention, hydrolyzed lignocellulose sheets which are applicable in the novel method preferably have densities of from about 0.4 to about 0.8 and thicknesses ranging from about 0.4 to about 0.75 inch. Such sheets, either singly or in plurality, comprise the cores for the production of decorative laminates. Facing and backing sheets applicable therewith may consist of additional sheets of the same light porous lignocellulose material, wood veneer, resin-containing sheets of paper or textiles and the like decorative sheets, metallic foil, or other suitable sheets which impart to the finished laminate the desired type of surface.

The aqueous resin solutions or colloidal dispersions may be varied within wide limits. For example, an aqueous mixture containing about 10% of phenol-formaldehyde resin and 90% of water may be employed or, where desired, the resin content of the mixture may be increased to 60% to 70% or more. Other commercially available resins such as phenol-furfural resins, melamine-formaldehyde resins, various alkyd resins, acrylates, and the like resins may also be employed. The main limiting factor in the employment of the resin mixtures is that of viscosity which may be so great as to interfere with the spraying technique or, in some instances, even with impregnation of the lignocellulose sheets. In a broad sense, however, the aqueous resin mixture may have any desired resin solids content, particularly since it may be desired to apply the resin by roll coating, knife coating, or similar means. Furthermore, while from about 4 or 5% of resin to about 15% of resin applied to the sheet surfaces is ordinarily sufficient, obviously greater or smaller amounts may be employed where desired.

Having applied to the lignocellulose sheets the required amount of moisture, together with the desired amount of resin, the sheets are then subjected to heat and pressure as for example in a multi-platen press wherein a plurality of the sheets may be consolidated at the same time. Where it is desired to produce an article having a smooth resin-coated surface, the sheets may be pressed without the application of any surface sheets, the resin already applied to the light sheet providing the finished surface. Where laminated articles are to be produced, the resin-treated light sheets may be arranged in stacks and may be pressed as such either with or without the application of top or bottom facing and backing sheets. In the event that surface sheets consisting of resin-containing paper are employed, the pressing conditions must be such that the resin is not deteriorated or discolored. In general, the temperatures to be employed during the pressing treatment are within the range of from about 135° C. to about 190° C. although in some instances higher temperatures may be resorted to. Temperatures lower than about 135° C. will not ordinarily promote sufficient consolidation of the lignocellulose fibers and the finished product will not have the necessary strength. Pressures to be employed may be within the range of about 500 p. s. i. to about 2,000 p. s. i. or more depending upon the type of press employed and the pressures obtainable therewith. Ordinarily, lower pressures are employed with relatively high moisture content in the lignocellulose sheets, with the higher pressures being employed when the intermediate sheets contain little moisture. Lower pressures may also be employed when pressing the laminates at relatively high temperatures and the reverse is true when low pressing temperatures are employed. During the pressing operation the moisture, which has previously been largely concentrated at the surfaces of the lignocellulose sheets, penetrates substantially uniformly therethrough and serves as a plasticizer for the natural binding agents present therein. Finished panels may thereby be produced having densities ranging from about 1.2 to about 1.42 or slightly higher.

One of the limiting features of the invention, which has hereinbefore been illustrated, resides in the necessity for cooling the compressed article, while under pressure, to a temperature below the boiling point of water, i. e. below about 100° C. By this treatment, the moisture contained in the laminated article is prevented from escape therefrom. Thus, the formation of surface blisters, areas of low density, and the like difficulties are avoided. The products of the invention, containing the desired amount of moisture evenly distributed throughout the article have no internal stress and therefore are not subject to warping during storage and use. Likewise, due to the resin application, the finished article shows greatly improved bond strength and does not have any tendency to delaminate.

We claim:

1. Process of preparing a dense fibrous lignocellulose sheet comprising forming hydrolyzed lignocellulose fibers into a porous sheet having a density of about 0.4 to about 0.8 and a moisture content of substantially zero, applying to the surfaces of the dry sheet a sufficient amount of an aqueous resin mixture to provide from about 2% to about 8% of moisture on and in the sheet, said resin mixture comprising from about 90% water and 10% resin to about 30% water and 70% resin, subjecting the sheet to heat and pressure sufficient to obtain a final density within the range of from about 1.2 to about 1.42 in the pressed sheet and to cure the resin to insoluble state, said pressing temperature being in excess of 100° C., and then cooling the compressed sheet while under pressure to a temperature below about 100° C.

2. Process of preparing a dense laminate of fibrous lignocellulose which comprises forming hydrolyzed lignocellulose fibers into porous sheets having densities of about 0.4 to about 0.8 and moisture contents of substantially zero, applying to the surfaces of the dry sheets a sufficient amount of an aqueous resin mixture to provide from about 2% to about 8% of moisture on and in the sheets, said resin mixture comprising from about 90% water and 10% resin to about 30% water and 70% resin, arranging a plurality of said sheets into a stack, subjecting the stack to heat and pressure whereby there is obtained a moisture-containing laminate having a density within the range of from about 1.2 to about 1.42, said pressing temperature being in excess of 100° C., and cooling the laminate while under pressure to a temperature below about 100° C.

3. Process of preparing a dense decorative laminate of fibrous lignocellulose which comprises forming hydrolyzed lignocellulose fibers into a porous sheet having a density of about 0.4 to about 0.8 and a moisture content of substantially zero, applying to the surfaces of the dry sheet a sufficient amount of an aqueous resin mixture to provide from about 2% to about 8% of moisture on and in the sheet, said resin mixture comprising from about 90% water and 10% resin to about 30% water and 70% resin, arranging a stack including an intermediate sheet consisting of said treated lignocellulose sheet and top and bottom facing and backing sheets, subjecting the stack to heat and pressure, said pressing temperature being in excess of 100° C., and then cooling the compressed stack under pressure whereby there is obtained a decorative laminate having a density within the range of from about 1.2 to about 1.42.

4. Process of preparing a dense decorative laminate of fibrous lignocellulose which comprises drying a felted porous hydrolyzed lignocellulose sheet having a density of about 0.4 to about 0.8 to substantial dryness, applying to the surfaces of said sheet a sufficient amount of an aqueous resin mixture to provide from about 2% to about 8% of moisture in and on the sheet, said resin mixture comprising from about 90% water and 10% resin to about 30% water and 70% resin, arranging a stack including an intermediate sheet consisting of said treated lignocellulose sheet and top and bottom facing and backing sheets, subjecting the stack to heat and pressure, said pressing temperature being in excess of 100° C., and then cooling the compressed stack under pressure whereby there is obtained a decorative laminate having a density of from about 1.2 to about 1.42.

5. Process of preparing a dense laminate of fibrous lignocellulose which comprises forming hydrolyzed lignocellulose fibers into a porous sheet having a density of about 0.4 to about 0.8 and a moisture content of substantially zero, applying to the surfaces of the dry sheet a sufficient amount of an aqueous resin mixture to provide a moisture content on and in the sheet fibers of from about 2% to about 8%, said resin mixture comprising from about 90% water and 10% resin to about 30% water and 70% resin, arranging a stack including an intermediate sheet consisting of said treated lignocellulose sheet and non-adhesive-containing top and bottom facing and backing sheets, subjecting the stack to heat and pressure, said pressing temperature being in excess of 100° C., and then cooling the compressed stack under pressure whereby there is obtained a laminate having a density within the range of from about 1.2 to about 1.42.

References Cited in the file of this patent

UNITED STATES PATENTS

| | | |
|---|---|---|
| 1,735,668 | Benge et al. | Nov. 12, 1929 |
| 2,067,012 | Loetscher | Jan. 5, 1937 |
| 2,080,078 | Mason et al. | May 11, 1937 |
| 2,120,137 | Mason | June 7, 1938 |
| 2,190,672 | Meharg | Feb. 20, 1940 |
| 2,459,851 | Story | Jan. 25, 1949 |
| 2,557,071 | Boehm | June 19, 1951 |